Patented Jan. 5, 1943

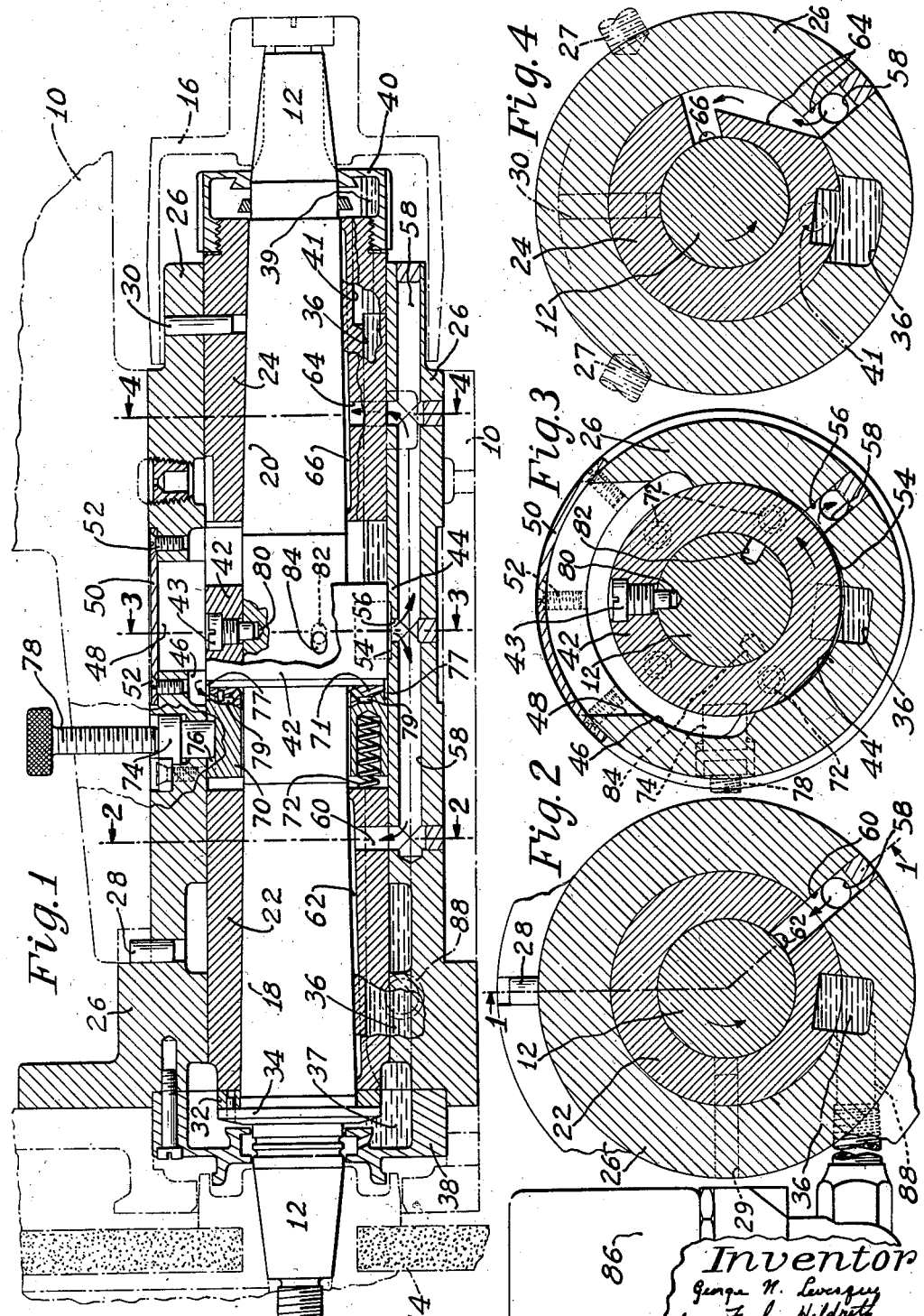

2,307,282

UNITED STATES PATENT OFFICE 2,307,282

MACHINE TOOL

George N. Levesque, Providence, R. I., assignor to Brown and Sharpe Manufacturing Company, a corporation of Rhode Island Application August 30, 1940, Serial No. 354,843

8 Claims. (Cl. 184—6)

The present invention relates to machine tools, and more particularly to a high-speed spindle bearing assembly including means for lubricating the same.

The invention is herein disclosed as embodied in a grinding machine having a grinding wheel and a grinding wheel spindle which is adapted to be continuously driven at a high speed. In order to obtain the highest possible degree of accuracy in grinding operations, it is essential to maintain a true axis of rotation of the grinding wheel and its supporting spindle while rotating at high speed and under a relatively heavy load. In order to meet this requirement, it has been proposed to utilize bearing constructions in which an extremely close operating fit is maintained between the bearing and the rotating spindle or journal member. Lubrication is preferably obtained by the use of an extremely fluid or low viscosity lubricating medium, such as kerosene, which is supplied to the bearing surfaces under a continuously maintained pressure sufficient to prevent any possible breakdown of the oil film.

It is the principal object of the present invention to provide a novel and improved spindle and bearing assembly, including as an integral part thereof a self-contained force-feed lubricating system particularly adapted for maintaining an adequate supply of lubricant under pressure in one or more close fitting high speed bearings.

More specifically, it is an object of the invention to provide a novel and improved force-feed lubricating system for a grinding wheel spindle or similar rotating journal part in which the lubricant is drawn from a reservoir forming an integral part of the bearing assembly, and is distributed to the spindle bearings under pressure by means of a novel and extremely simple lubricant pumping device which is directly driven from the spindle.

Other objects of the invention relate more specifically to the construction and arrangement of applicant's spindle bearing assembly embodying therein a self-contained force-feed lubrication system, which is simple in construction, is organized to permit easy assembly and dis-assembly of the parts, and is well adapted to insure a stable and accurate support for the rotating spindle.

With these and other objects in view, as may hereinafter appear, a principal feature of the invention consists in the provision of a force-feed lubrication device for a high-speed spindle or similar journal member, which comprises a high speed rotor having a peripheral surface to which lubricant is supplied, and a cooperating bearing surface or casing for the rotor having formed therein an eccentric bore portion to provide a wedge-shaped pocket into which a lubricant is forced under pressure and from which it is drawn off by a system of conduits to supply lubricant to one or more close-fitting bearings.

Another feature of the invention consists in the construction and arrangement of the spindle bearing support, whereby the entire lubricating system including reservoirs, lubricant pumping device, and distributing conduits, is housed within a bearing supporting cartridge sleeve to provide a self-contained grinding wheel spindle assembly which may be installed and may be removed from the machine as a unit.

Another feature of the invention consists in the construction and arrangement of the rotor pump member and the cooperating bearing surface in the spindle cartridge sleeve to provide in the upper portion of the cartridge sleeve an additional reservoir to which lubricant is carried by the rotor and from which lubricant is drawn by gravity feed to lubricate certain of the bearing surfaces.

Another feature of the invention consists in the specific arrangement of applicant's wheel spindle assembly including two tapered supporting bearings for the wheel spindle, both being tapered in the same direction in combination with the pump rotor secured to the spindle, and a resilient end thrust bearing collar which acts against one face of the rotor to force the spindle axially against the tapered bearing surfaces.

Further in accordance with the invention, provision is made for axial adjustment of the pump rotor on the spindle, so that the resilient pressure against the end thrust bearings may be maintained substantially constant as the bearings are taken up and the spindle enters the bearings to a greater extent.

The several features of the invention consist also in the devices, combinations and arrangement of parts hereinafter described and claimed, which together with the advantages to be obtained thereby will be readily understood by one skilled in the art from the following description taken in connection with the accompanying drawing, in which Fig. 1 is a sectional view of a grinding wheel spindle assembly taken on the line I—I of Fig. 2, but with broken portions of the main lubricant reservoir and the key construction for the spindle end thrust collar swung about the spindle axis into the plane of this figure to show the arrangement of these parts in assembly; Fig. 2 is a sectional view taken on the line 2—2 of Fig. 1, showing the left-hand tapered bearing for the spindle, a constant level oiler from which oil is supplied to the reservoir, and a portion of the lubricant conduit leading to this bearing; Fig. 3 is a sectional view taken on the line 3—3 of Fig. 1, illustrating particularly the pump rotor, and its external bearing in the spindle cartridge sleeve, together with the associated auxiliary reservoir and outlet for lubricant to the spindle end thrust bearing; and Fig. 4 is a sectional view taken on the line 4—4 of Fig. 1, illustrating particularly the right-hand tapered bearing for the spindle of Fig. 1, together with a portion of the conduit for supplying lubricant under pressure to this bearing.

The invention is disclosed in the drawing as embodied in a preferred form in a grinding machine, which may be of ordinary construction, comprising a machine support generally indicated at 10 in dot-and-dash lines and within which the spindle assembly is housed. A rotating grinding wheel spindle or journal member is designated at 12, having mounted on one end thereof a grinding wheel 14 and at its other end a driving pulley designated at 16 in Fig. 1 in dot-and-dash lines. The spindle 12 is provided with two tapered portions 18 and 20 which are fitted within tapered cylindrical bearings 22 and 24, respectively. It will be noted that the tapered portion 18 is larger than the tapered portion 20 to facilitate in assembly of the spindle with its bearings. The bearings 22 and 24 are rigidly secured within a bearing supporting cartridge sleeve 26, which is in turn rigidly secured within a cylindrical bore in the machine support 10. The cartridge sleeve 26 is conveniently secured in position by a pair of locking screws 27 indicated in dot-and-dash lines in Fig. 4, and by the engagement of a vertically disposed locking pin 28 with a correspondingly slotted portion of the machine support 10, as shown in Figs. 1 and 2. The bearings 22 and 24 respectively, are secured in position within the cartridge 26 by means of a pin 29 and a pin 30 which are fitted into radial bores in the cartridge sleeve and in the bearing members. The end thrust of the spindle in one direction is taken up by means of a washer 32, secured to a flanged portion 34 of the spindle adjacent the grinding wheel, and arranged to bear against one end of the spindle bearing member 22. The means for taking up end thrust of the spindle in the opposite direction will be hereinafter specifically described in connection with applicant's improved lubricant pumping device.

In accordance with the present invention, a force-feed lubrication system is provided which is entirely self-contained within the bearing supporting cartridge sleeve 26 for supplying lubricant under pressure to the spindle bearings, and for which power is supplied directly from the rotating spindle. Further in accordance with the invention, applicant's spindle assembly and the lubricating system therefor are particularly adapted to permit efficient use of a light, low viscosity lubricant such, for example, as kerosene, although it will be understood that heavier lubricants may be employed, if so desired.

As best shown in Figs. 1 and 2 of the drawing, lubricant is drawn from a reservoir which takes the form of a slot 36 extending the length of the inner periphery of the cartridge sleeve 26 at its lower side. Added height is given to the reservoir by correspondingly slotted portions formed in the bearing members 22 and 24. The reservoir 36 terminates at one end of the cartridge sleeve 26 in a chamber 37 formed within a cap member 38 secured to the front end of the cartridge sleeve. The chamber 37 provides an oil bath into which the spindle end thrust collar 32 dips, and also serves as a return conduit for excess oil which may be forced outwardly through the end of the bearing 22. The opposite end of the reservoir 36 is connected by means of a drilled hole 41 in the bearing 24 with a chamber 39 formed within a cap member 40 screw-threaded to the rear end of the bearing member 24, providing a return conduit to collect lubricant which may be forced out of the end of the bearing 24.

In the present construction, the lubricant pumping means for drawing lubricant from the reservoir 36 and for distributing it under pressure comprises a rotor 42 in the form of a sleeve collar rigidly secured by means of a locking screw 43 to the spindle 12. As best shown in Fig. 1, the rotor 42 is supported on the spindle at a point between the tapered bearings 22 and 24, and is arranged at its lower side to dip into the lubricant reservoir 36. As best shown in Fig. 3 of the drawing, the rotor 42 is supported to rotate within a semi-cylindrical bearing surface 44 formed in the cartridge sleeve 26, of which substantially the upper half is widened out to provide an auxiliary reservoir chamber 46 above the rotor. In order to provide access to the rotor and associated parts, an opening 48 is cut through the upper side of the cartridge sleeve 26 forming an upward extension of the reservoir chamber 46. An arcuate cover plate 50 held in position by locking screws 52 normally caps the opening 48. Immediately to the right of the reservoir 36 as viewed in Fig. 3, an eccentric portion or channel 54 is cut in the bearing surface 44 of somewhat less width than the peripheral surface of the rotor 42 and providing with rotor surface a wedge-shaped chamber into which lubricant is carried by the counter-clockwise rotational movement of the spindle as designated by the arrow in Fig. 3. Near the center of the wedge-shaped chamber formed by the eccentric portion 54, there is provided an outlet 56 which connects with a longitudinally extending bore or conduit 58 formed in the wall of the cartridge sleeve 26. The conduit 58 is provided with two inlets, one of which designated at 60 in Figs. 1 and 2 connects with an oiling groove 62 in the bearing member 22 to provide lubricant to the tapered bearing surface 18 of the spindle. The other inlet designated at 64 in Figs. 1 and 4, connects with an oil groove 66 in the bearing member 24 to provide oil to the tapered bearing surface 20 of the spindle.

During operation of the grinding wheel spindle 12, the peripheral surface of the rotor 42 passing through the reservoir 36 at high speed tends to pick up lubricant and to force it into the wedge-shaped pocket provided by the eccentric portion 54 which causes a considerable lubricant pressure to be built up toward the apex of the wedge. Lubricant under pressure is thus forced into the outlet 56 and conduit 58 and through inlets 60 and 64 respectively, to supply lubricant under pressure to both tapered spindle bearings. It has been found that with the high rotational speed of the spindle, ample pressure of the lubricant is provided to insure the proper lubrication of the rapidly rotating spindle.

With the present construction in which two tapered bearings are employed, both being tapered in the same direction, a close operating fit is maintained by means of a spring-pressed end thrust collar 70 fitted with a bearing 71 which engages against a bearing surface formed on the left face of the rotor 42 as viewed in Fig. 1. The thrust collar 70 and washer 71 are arranged to be seated yieldingly against the rotor 42 by means of four compression springs 72 seated within recesses formed in the thrust collar 70 and engaging at their opposite ends against the adjacent face of the tapered bearing member 22. A key member 74 supported in the left side of the cartridge sleeve 26 engages within a longitudinally extending peripheral slot 76 in the thrust collar 70 to lock the collar against rotational movement while permitting lengthwise adjustment thereof under the influence of the springs 72. The thrust collar 70 can be locked in its position of resilient adjustment by means of a knurled headed set screw 78 screw-threaded into the machine frame 10 for engagement against the upper end of the key member 74. As best shown in Fig. 1 of the drawing, the auxiliary reservoir 46 extends longitudinally over the upper edge of the thrust bearing provided by the thrust washer 70 and the rotor 42 for the lubrication of this bearing. From the auxiliary reservoir 46, lubricant passes by gravity feed into an annular recess or groove 77 which extends across the peripheral edges of the bearing surfaces, and also passes through small openings into an annular conduit 79 formed between the collar 70 and washer 71, and thence flows through a number of small outlets to the bearing surfaces. Lubricant is supplied from the reservoir 36 to the auxiliary reservoir 46 by the rotational movement of the rotor 42. A certain part of the lubricant forced into the wedge-shaped chamber formed by the eccentric portion 54 will be carried past the outlet 56 between the peripheral surface of the rotor 42 and the semi-cylindrical bearing surface 44 into the auxiliary reservoir 46, whence it is permitted to move by gravity as above set forth to lubricate the bearing surfaces between the end thrust washer 71 and rotor 42.

In order to compensate for wear which may take place between the tapered bearing portions 18 and 20 of the spindle and the tapered bearings 22, 24, provision is made for axially adjusting the position of the rotor 42 on the spindle. To this end, three separate holes are provided around the periphery of the spindle 12 and offset along the axis of rotation from one another to receive the locking screw 43. Whenever a sufficient amount of wear between the tapered bearing surfaces has taken place, so that the thrust washer 70 is forced too far to the right, with consequent loss in the take-up pressure exerted by the springs 72, the locking screw 43 is withdrawn and the rotor is turned sufficiently to permit the engagement of the locking screw 43 in another of these holes. As shown in Fig. 1, the locking screw 43 is engaged within a hole or recess 80. A take-up adjustment of the spindle bearings will be provided by engaging the screw 43 in the recess 82, and a still further take-up adjustment may be effected by engaging the locking screw 43 in the hole 84.

With the present construction, it is proposed to maintain an adequate supply of lubricant in the reservoir 40 by means of a constant level oiler which may be of ordinary construction, and is designated at 86 in Fig. 2. The constant level oiler 86 connects with an inlet conduit 88 to the reservoir 39 adjacent the grinding wheel end of the spindle, and forwardly of the machine support 10, so that the constant level oiler is directly secured to the cartridge 26, and forms an integral part of the grinding wheel spindle assembly. It will be understood that the invention is not limited to the specific embodiment shown, and that various deviations may be made therefrom without departing from the spirit and scope of the appended claims.

What is claimed is:

1. In a grinding wheel spindle assembly, the combination with a rotating spindle, of spindle bearings, a cartridge sleeve in which said spindle and spindle bearings are supported, a lubricant reservoir within the cartridge sleeve, a rotary lubricant pump supported concentrically with the spindle within the cartridge sleeve and connected to be driven by the spindle, and conduits within the cartridge sleeve for directing lubricant under pressure from the pump to the spindle bearings.

2. In a grinding wheel spindle assembly, the combination with a rotating spindle, of a pair of spindle bearings, a lubricant pump comprising a rotor supported concentrically with the spindle and connected to be driven thereby, a cartridge sleeve within which said spindle, spindle bearings and pump rotor are supported, a bearing surface providing a housing for the rotor formed in the cartridge sleeve, conduits formed in said cartridge sleeve and in said bearings for conveying lubricant under pressure from the pump to the spindle bearings, and a lubricant reservoir formed in the wall of the cartridge sleeve at its lower side and extending lengthwise thereof passing beneath the rotor for supplying lubricant thereto and beneath said spindle bearings to provide return conduits for excess lubricant supplied to the said bearings.

3. In a grinding wheel spindle assembly, the combination with a rotating spindle, of a pair of spindle bearings, a lubricant pump comprising a rotor supported concentrically with the spindle and connected to be driven thereby, a cartridge sleeve within which said spindle, spindle bearings and pump rotor are supported, a bearing surface providing a housing for the rotor formed in the cartridge sleeve, conduits formed in said cartridge sleeve and in said bearings for conveying lubricant under pressure from the pump to the spindle bearings, a lubricant reservoir formed in the wall of the cartridge sleeve at its lower side and extending lengthwise thereof passing beneath the rotor for supplying lubricant thereto and beneath said spindle bearings to provide a return conduit for excess lubricant supplied to the said bearings, and a constant level lubricant device supported integrally with the cartridge sleeve for maintaining a constant level of lubricant in the reservoir.

4. In a spindle bearing assembly, the combination with a rotating spindle, of a spindle bearing, a cartridge sleeve within which the spindle and spindle bearing are housed, a lubricant pump comprising a rotor having a lubricant engaging peripheral surface supported concentrically with and arranged to be driven by the spindle, a bearing surface associated with said rotor peripheral surface formed in the cartridge sleeve, a lubricant reservoir interrupting said bearing surface at its lower side, an eccentric portion formed in said bearing surface providing with the rotor peripheral surface a wedge-shaped pocket contiguous with said reservoir and extending in the direction of rotation of said rotor, and a lubricant conduit connecting said pocket with the spindle bearing.

5. In a spindle bearing assembly, the combination with a rotating spindle having a tapered bearing surface, of a tapered bearing for the spindle, a lubricant pump comprising a rotor having a lubricant engaging peripheral surface and rigidly supported on the spindle to turn therewith, a bearing surface cooperating with the peripheral surface of the rotor including an eccentric portion providing with the rotor surface a wedge-shaped chamber in which a pressure of lubricant is built up by the rotary movement of the rotor, means for supplying lubricant to the peripheral surface of the rotor at the base of said wedge-shaped pocket, a conduit supplying lubricant under pressure from the pocket to the spindle bearing, a resilient end thrust bearing engaging against one face of said rotor for seating the spindle axially against its taper bearing, and means for adjusting the position of the rotor axially on the spindle to take up wear between the spindle and the taper spindle bearing.

6. In a grinding wheel spindle bearing assembly, the combination with a rotating spindle having a plurality of tapered bearing portions tapered in the same direction, of tapered spindle bearings associated therewith, a lubricant pump comprising a rotor secured to the spindle to turn therewith, means for supplying lubricant to the rotor, a conduit for conveying lubricant under pressure from the pump to said tapered bearings, a resilient end thrust bearing collar acting against one face of the rotor for forcing the spindle axially to seat the tapered portions thereof against the tapered bearing, and means for effecting axial adjustment of the rotor on the spindle to compensate for wear in the tapered spindle bearings.

7. In a grinding wheel spindle bearing assembly, the combination with a rotating spindle, of a spindle bearing, a cartridge sleeve within which the spindle and spindle bearings are housed, a lubricant pump comprising a rotor having a lubricant engaging peripheral surface supported concentrically with and secured to turn with the spindle, a bearing surface within the cartridge sleeve cooperating with said rotor peripheral surface, a lubricant reservoir interrupting said bearing surface beneath the rotor, an eccentric portion in said bearing surface forming a wedge-shaped pocket contiguous with said reservoir and extending in the direction of rotation of the rotor, a conduit from said pocket for supplying lubricant under pressure to the spindle bearing, a lubricant chamber formed by a dis-continuation of said bearing surface above the rotor, a spindle end thrust bearing acting against one side of said rotor, and a gravity feed connection between said spindle end thrust bearing and said lubricant chamber.

8. In a grinding wheel spindle bearing assembly, the combination with a rotating spindle having a pair of tapered bearing portions tapered in the same direction, of tapered spindle bearings associated therewith, a lubricant pump comprising a rotor having a lubricant engaging surface secured to the spindle to turn therewith between said tapered bearings, a cartridge sleeve within which the spindle, spindle bearings and rotor are housed, a substantially semi-cylindrical bearing surface engaging with the lower portion of said rotor peripheral surface, a lubricant reservoir interrupting said bearing suface beneath the rotor, an eccentric portion in said bearing surface forming a wedge-shaped pocket contiguous with said reservoir and extending in the direction of rotation of the rotor, a conduit from said pocket for supplying lubricant under pressure to the spindle taper bearing surfaces, return connections from said bearing surfaces to the reservoir, a lubricant chamber formed by the dis-continuation of said rotor bearing surface above the rotor, a spindle end thrust bearing acting against one side of the rotor to seat the spindle in its tapered bearings, and a gravity feed connection between the spindle end thrust bearing and the lubricant chamber.

GEORGE N. LEVESQUE.